United States Patent
Zelenev et al.

(10) Patent No.: US 11,001,748 B2
(45) Date of Patent: *May 11, 2021

(54) METHOD OF PREPARING AND USING A DRAG-REDUCING ADDITIVE HAVING A DISPERSION POLYMER

(71) Applicant: Flotek Chemistry, LLC, Houston, TX (US)

(72) Inventors: Andrei Zelenev, Spring, TX (US); Lakia Champagne, The Woodlands, TX (US); David Philpot, Marlow, OK (US)

(73) Assignee: Flotek Chemistry, LLC, Marlow, OK (US)

(*) Notice: Subject to any disclaimer, the term of this patent is extended or adjusted under 35 U.S.C. 154(b) by 222 days.

This patent is subject to a terminal disclaimer.

(21) Appl. No.: 16/206,907

(22) Filed: Nov. 30, 2018

(65) Prior Publication Data

US 2019/0093003 A1  Mar. 28, 2019

Related U.S. Application Data

(60) Continuation of application No. 15/907,226, filed on Feb. 27, 2018, now Pat. No. 10,144,865, which is a division of application No. 14/323,830, filed on Jul. 3, 2014, now abandoned, which is a continuation of application No. 12/268,408, filed on Nov. 10, 2008, now Pat. No. 8,865,632.

(51) Int. Cl.

| | |
|---|---|
| C09K 8/68 | (2006.01) |
| C09K 8/60 | (2006.01) |
| C09K 8/512 | (2006.01) |
| C09K 8/528 | (2006.01) |
| C09K 8/588 | (2006.01) |
| C09K 8/64 | (2006.01) |
| C09K 8/82 | (2006.01) |
| E21B 43/20 | (2006.01) |
| C09K 8/584 | (2006.01) |

(52) U.S. Cl.
CPC ............... *C09K 8/68* (2013.01); *C09K 8/512* (2013.01); *C09K 8/528* (2013.01); *C09K 8/584* (2013.01); *C09K 8/588* (2013.01); *C09K 8/604* (2013.01); *C09K 8/608* (2013.01); *C09K 8/64* (2013.01); *C09K 8/82* (2013.01); *E21B 43/20* (2013.01); *C09K 2208/28* (2013.01)

(58) Field of Classification Search
CPC .... C09K 2208/28; C09K 8/512; C09K 8/528; C09K 8/584; C09K 8/588; C09K 8/604; C09K 8/608; C09K 8/64; C09K 8/68; E21B 43/20

See application file for complete search history.

(56) References Cited

U.S. PATENT DOCUMENTS

| | | | |
|---|---|---|---|
| 3,284,393 A | 11/1966 | Vanderhoff et al. | |
| 3,624,019 A * | 11/1971 | Anderson | C02F 1/5227 523/336 |
| 3,734,873 A | 5/1973 | Anderson et al. | |
| 4,152,274 A | 5/1979 | Phillips et al. | |
| 4,500,437 A | 2/1985 | Engelhardt et al. | |
| 4,921,903 A * | 5/1990 | Fong | C08F 8/32 524/555 |
| 4,929,655 A | 5/1990 | Takeda et al. | |
| 5,006,590 A | 4/1991 | Takeda et al. | |
| 5,027,843 A | 7/1991 | Grabois et al. | |
| 5,270,412 A | 12/1993 | Rauterkus et al. | |
| 5,458,197 A | 10/1995 | Chan | |
| 5,547,925 A | 8/1996 | Duncan, Jr. | |
| 5,587,415 A | 12/1996 | Takeda | |
| 5,597,858 A | 1/1997 | Ramesh et al. | |
| 5,605,970 A | 2/1997 | Selvarajan | |
| 5,708,071 A | 1/1998 | Takeda | |
| 5,837,776 A | 11/1998 | Selvarajan et al. | |
| 5,925,714 A | 7/1999 | Larson | |
| 5,939,362 A | 8/1999 | Johnson et al. | |
| 6,020,422 A | 2/2000 | Connors et al. | |
| 6,071,379 A | 6/2000 | Wong Shing et al. | |
| 6,217,778 B1 | 4/2001 | Shing et al. | |
| 6,221,957 B1 | 4/2001 | Nzudie et al. | |
| 6,265,477 B1 | 7/2001 | Hurlock | |
| 6,313,246 B1 | 11/2001 | Carter et al. | |
| 6,365,052 B1 | 4/2002 | Sivakumar et al. | |
| 6,365,656 B1 | 4/2002 | Green et al. | |
| 6,398,967 B2 | 6/2002 | Sparapany et al. | |
| 6,531,531 B1 | 3/2003 | Han | |
| 6,571,677 B1 | 6/2003 | Kaura | |
| 6,590,051 B1 | 7/2003 | Carter et al. | |
| 6,605,674 B1 | 8/2003 | Whipple et al. | |
| 6,696,067 B2 | 2/2004 | Brandt et al. | |
| 6,709,551 B2 | 3/2004 | Coffey et al. | |
| 6,753,388 B1 | 6/2004 | Whipple et al. | |
| 6,787,506 B2 * | 9/2004 | Blair | C09K 8/68 507/222 |
| 6,831,042 B2 | 12/2004 | Ristol et al. | |
| 7,004,254 B1 * | 2/2006 | Chatterji | C09K 8/12 166/279 |

(Continued)

FOREIGN PATENT DOCUMENTS

| | | |
|---|---|---|
| EP | 0630909 B1 | 12/1994 |
| EP | 0657478 A2 | 12/1995 |

(Continued)

*Primary Examiner* — Alicia Bland
(74) *Attorney, Agent, or Firm* — Crowe & Dunlevy, P.C.

(57) ABSTRACT

A method begins with the step of preparing a drag-reducing additive by mixing a dispersion polymer with a surfactant and a solvent. The method continues with the step of forming a drag-reducing composition by combining the drag-reducing additive with an aqueous treatment fluid. The method further involves the step of injecting the drag-reducing composition into a subterranean formation, a pipeline or a gathering line.

11 Claims, No Drawings

(56) References Cited

U.S. PATENT DOCUMENTS

| | | |
|---|---|---|
| 7,117,943 B2 | 10/2006 | Harris et al. |
| 7,205,262 B2 | 4/2007 | Schwartz et al. |
| 7,232,793 B1 | 6/2007 | King et al. |
| 7,250,462 B2 | 7/2007 | Kubota et al. |
| 7,255,750 B2 | 8/2007 | Cartwright et al. |
| 7,271,134 B2 | 9/2007 | King et al. |
| 7,311,146 B1 | 12/2007 | Hanes, Jr. et al. |
| 7,323,510 B2 | 1/2008 | Fischer et al. |
| 7,429,625 B2 * | 9/2008 | Harrington ............... C08J 3/03 524/376 |
| 7,473,334 B2 | 1/2009 | Wong Shing et al. |
| 7,504,366 B2 | 3/2009 | Hanes, Jr. et al. |
| 7,582,590 B2 | 9/2009 | Hanes, Jr. et al. |
| 7,893,010 B2 | 2/2011 | Ali et al. |
| 8,398,963 B2 | 3/2013 | Kim et al. |
| 8,865,632 B1 | 10/2014 | Parnell |
| 8,916,508 B2 | 12/2014 | Parnell |
| 2002/0173569 A1 | 11/2002 | Karhu et al. |
| 2004/0132896 A1 | 7/2004 | Kubota et al. |
| 2004/0214961 A1 * | 10/2004 | Gartner ............... A61L 15/60 525/329.7 |
| 2005/0209382 A1 | 9/2005 | Yale et al. |
| 2006/0144595 A1 | 7/2006 | Milligan et al. |
| 2007/0135310 A1 * | 6/2007 | Qu ............... C09K 8/524 507/90 |
| 2007/0135313 A1 * | 6/2007 | King ............... C09K 8/68 507/225 |
| 2008/0033094 A1 | 2/2008 | Bellmann et al. |
| 2008/0064614 A1 | 3/2008 | Ahrenst et al. |
| 2014/0323366 A1 | 10/2014 | Parnell et al. |

FOREIGN PATENT DOCUMENTS

| | | |
|---|---|---|
| EP | 1490581 A1 | 12/2004 |
| EP | 1551935 B1 | 7/2005 |
| WO | 9821271 | 5/1998 |
| WO | 0118064 A1 | 3/2001 |
| WO | 02083085 A1 | 10/2002 |
| WO | 2007068876 A1 | 6/2007 |
| WO | 2008020212 A1 | 8/2007 |

* cited by examiner

METHOD OF PREPARING AND USING A DRAG-REDUCING ADDITIVE HAVING A DISPERSION POLYMER

RELATED APPLICATIONS

This application is a continuation of U.S. patent application Ser. No. 15/907,226 filed Feb. 27, 2018 entitled, "Method of Preparing and Using Drag-Reducing Dispersion Polymer Compositions," which is a division of U.S. patent application Ser. No. 14/323,830 entitled "Drag-Reducing Copolymer Compositions," filed Jul. 3, 2014, which is now abandoned, which is a continuation of U.S. patent application Ser. No. 12/268,408, entitled "Drag-Reducing Copolymer Compositions," filed Nov. 10, 2008, which is now U.S. Pat. No. 8,865,632, the disclosures of which are herein incorporated by reference.

FIELD OF THE INVENTION

The present invention is generally related to the treatment of oil and gas wells and/or gathering lines and pipelines, and more particularly related to a composition and process for reducing the drag, or fluid friction, caused by the injection of aqueous treatment fluids into subterranean geological formations.

BACKGROUND OF THE INVENTION

Crude oil and natural gas are typically recovered from subterranean reservoirs through the use of drilled wells and production equipment. After the wells are drilled, cased and cemented, it is often necessary to stimulate the reservoir by means of hydraulic fracturing or acidizing to achieve economical flow of gas and oil. This typically requires pumping an aqueous treatment fluid into the well at high rates, so that the fluid will build up pressure and cause the formation to fracture.

In the process of pumping, substantial fluid friction pressure, or drag, is observed between the treatment fluid and the tubing or casing as the fluid reaches turbulent flow, thus causing a substantial energy loss. As a result of the energy loss, a higher pumping pressure is needed to achieve the desired flow rate and pressure. It is therefore common to include drag-reducing additives in the aqueous treatment fluids to suppress the turbulence and realize lower pumping pressures. Common drag-reducing additives include oil-external emulsions of polymers with oil-based solvents and an emulsion-stabilizing surfactant. The emulsions may include guar-based or polyacrylamide-acrylic acid (PAM-AA) copolymers. Typically these prior art emulsions consist of an aqueous phase dispersed in a non-aqueous phase, in a weight ratio of from about 5:1 to about 10:1 aqueous phase to non-aqueous phase.

The surfactants in known drag reduction emulsions are typically emulsifying surfactants that stabilize the emulsions. The emulsifying surfactants have low HLB values, generally between 4 and 8. The transfer of the polymer from inside the aqueous phase of the oil-external emulsion into an aqueous treatment fluid is achieved by the inversion of an emulsion. A common way to achieve this inversion is to use an inverting surfactant, which is typically water-soluble and has an HLB of greater than about 7. Inverting surfactants may be a part of polymer emulsion formulations or may be added to a solution into which the emulsion is to be inverted.

The problem encountered with these known treatments, however, is that inverting surfactants may adversely interact with the emulsifier or emulsion and destroy it prior to use. Thus, commercially available polymer emulsions generally contain less than 5% of inverting surfactant. Polymer emulsions with this low amount of inverting surfactant, however, may not provide the desired reduction in friction because the polymer emulsion either does not invert completely or is not brine or acid tolerant.

In the event that acid or high salt contents are encountered, emulsion copolymers of 2-Acrylamido-2-methyl propane sulfonic acid (AMPS) are commonly used. These AMPS copolymers, however, may be cost prohibitive. In either case, the high molecular weight polymers may also cause substantial damage to the formation permeability. Thus, there is a continued need for more effective compounds that are more efficient, more salt tolerant, and less damaging.

SUMMARY OF THE INVENTION

In one embodiment, the present invention includes a method that begins with the step of preparing a drag-reducing additive by mixing a dispersion polymer with a surfactant and a solvent. The method continues with the step of forming a drag-reducing composition by combining the drag-reducing additive with an aqueous treatment fluid. The method further involves the step of injecting the drag-reducing composition into a subterranean formation, a pipeline or a gathering line.

In another embodiment, the present invention includes a method that begins with the step of preparing a drag-reducing additive by mixing 40-85% by weight of a dispersion polymer with 10-35% by weight of a surfactant with an HLB greater than about 8 and 5-30% by weight of a solvent. The method continues with the step of forming a drag-reducing composition by combining the drag-reducing additive with an aqueous treatment fluid. The method also includes the step of injecting the drag-reducing composition into a subterranean formation, a pipeline or a gathering line.

DETAILED DESCRIPTION OF PREFERRED EMBODIMENTS

The present invention relates to the preparation and use of a polymer composition that can be used as a drag-reducing additive. Unlike prior art drag reducers, the additives of the preferred embodiments are formed by the combination of polymer with relatively high amount of surfactant. In a first embodiment, a three-component additive is formed upon the combination of a polymer and a surfactant with a solvent. In an alternate embodiment, a two-component additive is formed upon a combination of a polymer and a surfactant. It is understood that the compositions of these embodiments have a variety of uses, one of which is drag reduction. The solvent is preferably a terpene. The additives can be added to an appropriate treatment fluid to form a well treatment composition or a composition for treatment of gathering lines or pipelines.

In a preferred embodiment, the polymer component of the additive is in the form of a commercially-available polymer emulsion, which typically already includes some solvent and emulsion surfactant. However, polymer emulsion could be synthesized, instead of purchased. It will be understood that the term "polymer" includes both homopolymers and copolymers. Upon addition to the treatment fluid, the components of the drag-reducing additive form an oil-in-water emulsion that reduces the friction between the turbulent flow of the treatment fluid and the walls of the well tubing or casing, or the walls of a pipeline or gathering line. In a preferred embodiment, the treatment fluid is water-based. Upon dilution, the additive may form a microemulsion, a miniemulsion, a nanoemulsion or an emulsion.

By adding a relatively large amount of surfactant to the additive, compared to surfactant levels in prior art friction reducers, the hydrophilicity and dispersibility of the polymer is increased, thus increasing the stability of the system in aqueous downhole fluid or in a pipeline or gathering lines. Furthermore, the increased surfactant level increases the inversion rate of the additive, even under low energy conditions. As a result, less polymer is needed to achieve the desired friction-reducing performance, which results in less damage downhole. Another benefit of the increased surfactant level in the additive is improved performance in brine.

The first component in the system, the polymer, may be nonionic, zwitterionic, anionic, or cationic. The polymer may further be a dispersion polymer or an emulsion polymer. Such polymer preferably consists of acrylamide present in the amount between 1 and 100 mole % and cationic, anionic, zwitterionic, or nonionic monomers present in the amount between 0 and 99 mole %.

When the copolymer includes acrylamide and an anionic monomer, the anionic monomer may be acrylamidopropanesulfonic acid, acrylic acid, methacrylic acid, monoacryloxyethyl phosphate, or their alkali metal salts. When the copolymer includes acrylamide and a cationic monomer, the cationic monomer may be dimethylaminoethylacrylate methyl chloride quarternary salt, diallyldimethylammonium chloride (DADMAC), (3-acrylamidopropyl)trimethylammonium chloride (MAPTAC), (3-methacrylamido)propyltrimethylammonium chloride, dimethylaminoethyl-methacrylate methyl chloride quarternary salt, or dimethylaminoethylacrylate benzylchloride quarternary salt.

When the copolymer includes acrylamide and a nonionic monomer, the nonionic monomer may be acrylamide, methacrylamide, N-methylacrylamide, N,N-dimethyl(meth)acrylamide, octyl acrylamide, N(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acrylate, N-vinyl-2-pyrrolidone, glycerol mono((meth)acrylate, 2-hydroxyethyl (meth)acrylate, vinyl methylsulfone, or vinyl acetate.

When the copolymer includes acrylamide and a zwitterionic monomer, the zwitterionic monomer may be selected from those described in U.S. Pat. No. 6,709,551 or be selected from N,N-dimethyl-N-acryloyloxyethynyl-N-(3-sulfopropyl)-ammonium betaine, N,N-dimethyl-N-acrylamidopropyl-N-(2-carboxymethyl)-ammonium betaine, N,N-dimethyl-N-methacrylcryloyloxyethynyl-N-(3-sulfopropyl)-ammonium betaine, N,N-dimethyl-N-methacrylcryloyloxyethynyl-N-(3-sulfopropyl)-sulfoneum betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, or [(2-acryloylethyl)dimethylammonio]methyl phosphonic acid. It will be understood that the lists of potential monomers are not limiting, and the use of other monomers may also be appropriate.

From testing of various polymers in the three-component additive embodiment, it was determined that the use of a copolymer made up of polyacrylamide and an anionic monomer additive resulted in increased permeability restoration when compared to copolymers with nonionic or cationic monomers. Thus, it is preferred to use a copolymer of acrylamide and an anionic monomer, such as acrylic acid. In a presently preferred embodiment, the copolymer is a polyacrylamide-acrylic acid (PAM-AA) copolymer having a molecular weight from about 4 million to 20 million amu, with a percentage of acrylamide in the range of 60-99% by weight and a percentage of acrylic acid from 1 to 40% by weight.

The second component in the three component additive embodiment, the surfactant, may have a hydrophile-lipophile balance (HLB) of above about 7, and preferably has an HLB of between 11 and 15. It will be understood that the surfactant component may be made up of one surfactant or a blend of surfactants. Highly preferred nonionic surfactants have an HLB of 12 to 13. These surfactants aid in the inversion of the polymer when the additive comes into contact with aqueous treatment fluid, and are sometimes referred to as inverting surfactants. Preferred surfactants are liquids chosen from ethoxylated glycerides, ethoxylated sorbitan esters, ethoxylated alkyl phenols, ethoxylated alcohols, castor oil ethoxylates, cocoamide ethoxylates, and sorbitan monooleates such as polyoxyethylene 20 sorbitan monooleate (Tween® 80). In a particularly preferred embodiment, the surfactant is a castor oil ethoxylate with 30 moles of ethylene oxide (EO) per 1 mole of castor oil ethoxylate. In an alternate particularity preferred embodiment, the surfactant component is a surfactant mixture of: (i) alcohol ethoxylate C8-C18 with 5-20 moles EO; and (ii) ethoxylated castor oil with 25-45 moles of EO.

The third component in the three-component additive embodiment, the solvent, is preferably a blend of naturally occurring plant terpenes. Terpenes often consist of units of isoprene and have the formula $(C_5H_8)_n$, where n is the number of linked isoprene units. Other terpenes, such as those found in *eucalyptus* and peppermint oils, may include compounds containing oxygen. A complex plant-derived terpene typically includes a variety of compounds, including monoterpenes $(C_{10}H_{16})$, d-limonene, dipentene, 1-limonene, d,l-limonene, myrcene, and α-pinene. Additional terpenes include terpinolene, β-pinene, eucalyptol, α-terpineol, β-terpineol, sabinene, menthofurane, 1,8-cineole, citronellal, citronellol, menthol, mentohone, and alcohols and aldehydes of the same composition and mixtures thereof.

The terpene blend may be further combined with other solvents such as other plant-derived alcohols or esters, or aromatic hydrocarbons. Plant-derived alcohols in the solvent may include terpenoids and straight chain alcohols with the formula $CH_3(CH_2)_nOH$, where n≥9 or 11. Plant-derived esters include methyl and ethyl esters of naturally-occurring oils such as cottonseed or soybean oil. It should be noted that synthetic solvents can also be used as the solvent phase.

In a preferred embodiment, the solvent has a KB (Kauributanol) value of greater than about 60. Preferred terpenes are those derived from citrus fruits, *eucalyptus*, or mint. In a particularly preferred embodiment, the solvent is a biodegradable solvent blend primarily made up of d-limonene.

Emulsion polymers that comprise a component of the present additive can be either obtained from commercial suppliers or be synthesized. In a preferred embodiment, a drag-reducing additive is made by mixing about 40 to 85% by weight of a commercially available polymer emulsion, such as the type available from Hychem, Inc., with about 5 to 30% by weight additional solvent and about 5 to 35% by weight of additional surfactant. The commercially available polymer emulsion may include a polymer and small amounts of an emulsion surfactant, a solvent, and possibly an inverting surfactant. Thus, the additional solvent that is added to the polymer emulsion will be referred to as the second solvent, and the additional surfactant that is added to the polymer emulsion will be referred to as the second surfactant.

In a particularly preferred embodiment, the three-component drag-reducing additive is prepared by blending about 55 to 65% by weight of a commercially available polymer emulsion with about 10 to 30% by weight of a second terpene solvent and about 20% to 35% by weight of a second nonionic surfactant. In this preferred embodiment, the second nonionic surfactant is made up primarily of a surfactant with an HLB of 12 to 13, such as a castor oil ethoxylate with 30 moles of ethylene oxide. The commercially available polymer emulsion preferably includes acrylamide in the range of 60 to 90% by weight and acrylic acid in the range of 5 to 30% by weight. It is preferred to mix the additional surfactant and solvent before adding the polymer emulsion, but order of mixing is not critical. In other preferred embodiments, the drag-reducing additive includes other additives such as acids, bases, corrosion inhibitors, proppants, biocides, oxygen scavengers, asphaltene inhibitors, and oils.

In another embodiment, three-component drag-reducing additive is formed by synthesizing a polymer emulsion that is combined with the second terpene solvent and second surfactant, instead of using a commercially available polymer emulsion. The synthesized polymer emulsion is combined with the second solvent and second surfactant in the amounts described above. Methods suitable for preparation of emulsion polymers are well known to those skilled in the art. For example, such methods are described in U.S. Pat. Nos. 3,284,393; 3,734,873; 6,605,674; and 6,753,388. Suitable emulsion polymers can be prepared by a process that typically involves preparing an oil phase containing suitable surfactants, preparing an aqueous monomer phase containing the monomers, preparing a water-in-oil emulsion of the aqueous phase in the oil phase, and performing polymerization of monomers, usually by means of free radical polymerization. In certain instances structural modifiers or cross-linking agents can be added at various stages of the process. Suitable such agents and means of their addition would be known to those skilled in the art. Polymer solids in the prepared emulsion polymers typically comprise from about 5 to about 60% by weight. It should be understood, however, that there may be other methods of preparing the suitable polymer emulsion.

Friction reducing polymers suitable to practice the present invention may also be chosen from a class of dispersion polymers, such as those described in U.S. Pat. Nos. 4,929,655; 5,605,970; 5,837,776; 5,597,858; 6,217,778; 6,365,052; 7,323,510; and European patent EP630,909. Use of dispersion polymers for reducing friction has been disclosed in U.S. Pat. No. 6,787,506. Dispersion polymers may either be acquired from a commercial source or synthesized. Typical synthesis of dispersion polymers involves polymerizing one or more water-soluble monomers in an aqueous reaction mixture, wherein the aqueous reaction mixture contains a water soluble salt, at least one polymeric dispersant, optionally contains an organic alcohol, optionally contains a pre-formed polymer seed. The water soluble polymer formed as a result of polymerization is insoluble in the aqueous reaction mixture at the concentration thereof formed during the polymerization. Polymer solids in the prepared dispersion are typically from about 5% to about 60% by weight.

Dry (powder) polymers may be used as part of this additive if they are first dissolved in a treatment fluid miscible with water or as a dispersion. Other drag reducing polymers such as guar, xanthan, and other natural polymers along with synthetics can also be used in the practice of this invention.

When combined, the blend of the copolymer, solvent, and surfactant becomes a one phase system that may remain stable for more than 24 hours and may be adapted for use in a broad temperature range. Thus, each of the selected components in the drag-reducing additive may be mixed together before delivery to the well.

A two-component embodiment of the additive is preferably made by combining about 50-99% of a polymer emulsion with about 1-50% of a surfactant with an HLB above about 7. Having more than 50% surfactant may also yield suitable friction reducing formulations, but such systems may be unstable, not as effective and efficient in friction reduction, and not as cost-advantageous, as systems with less than 50% surfactant. The two-component additive becomes highly viscous when about 75-99% of the polymer emulsion is combined with about 1-25% of the surfactant. Addition of less than 5% of a solvent may result in producing high viscosity embodiment of the additive. Addition of a small amount of solvent may actually increase the viscosity of the additive, but upon addition of larger amounts of solvent, the viscosity will be decreased. In another embodiment, less than about 30% of the polymer emulsion is combined with about 70-99% of the surfactant with an HLB of above about 7. In a preferred embodiment, the two-component additive may be made by using a commercially available polymer emulsion, and the surfactant with an HLB of greater than about 7, and most preferably with an HLB of 12 to 13. The highly viscous form of the two-component additive may be delivered to a solution by a pump, extruding device or any other suitable means. The highly viscous form of the two-component additive may generally have a complex viscosity magnitude of greater than about 40 Pascal-sec (Pa s).

The additives described above have multiple uses. The uses may include, without limitation, drag reduction, flocculation, water clarification, solids/liquids separation, sludge dewatering, mining, and papermaking.

More specifically, compositions described above may be suitable as flocculation-promoting agents in solids-liquid separation, water treatment, papermaking, mining, and other applications. They can be used alone, or in a combination with various other additives typically used to promote flocculation. These other additives include but not limited to high molecular weight polymers bearing anionic and cationic charge or no charge at all. Some non-limiting examples of such polymers include various co-polymers of polyacrylamide, cross-linked, linear or branched, as well as polyethylene oxide and poly naphthalene sulfonate. Other known additives in the flocculation process that can be used in combination with the compositions of the present invention include chemically modified and unmodified polysaccharides, such as starches, coagulants, such as aluminum sulfate, poly aluminium chloride, poly-diallyl dimethyl ammonium chloride (DADMAC), poly-epichlorohydrine dimethyl ammonium chloride, 3-trimethylammonium propyl methacrylamide chloride (MAPTAC), or other similar substances. Other suitable additives can be chosen from a class of colloidal materials, such as colloidal silica, colloidal borosilicate, colloidal zirconium oxide, colloidal aluminum oxide and hydroxide, colloidal alumosilicate, or clays, both naturally occurring and synthetic, such as bentonite, laponite, saponite. Microgels, such as polysilicate microgel and polyalumosilicate microgel, are also suitable colloidal products. Structurally rigid polymers and polymer microbeads also may be used in combination with compositions of the present invention.

At the well site or in the pipelines or gathering lines, the drag-reducing additive is added to a water-based treatment fluid to be pumped downhole or through the piping system. In a preferred embodiment, the drag-reducing additive comprises about 0.05 to 2 gallons of solution per 1000 gallons of water (gpt).

In a presently preferred embodiment, the drag-reducing additive is delivered downhole or into a pipeline or gathering line by continuously adding it to the water-based treatment fluid as the treatment fluid is pumped, at rates of 0.05 to 5 gallons drag-reducing additive per 1000 gallons fracturing fluid. The drag-reducing additive is preferably added to the treatment fluid at or near the blending device and before the high pressure pumps in a fracturing treatment. In a friction-reducing application, the emulsion inverts rapidly as the fracturing fluid proceeds down the tubulars, allowing the copolymer solution to solubilize in the aqueous phase. The drag-reducing additive suppresses turbulence and lowers the necessary pumping pressure.

The following examples describe tests performed on various embodiments of the additive, as well as prior art drag-reducing systems. It will be understood that these examples are merely illustrative and are not to be considered limiting.

Testing

Friction loop devices to evaluate friction/drag reduction are known in the art. The device used to for the following tests consists of a 15 gallon tank from which fluid is pumped at a maximum flow rate of 12 gallons per minute (gpm) through a series of pipes. The first pipe is a 10 feet long with a 0.75 inch outer diameter (OD) and a 0.62 inch inner diameter (ID). The first pipe is connected to a 25 foot long, 0.50 inch OD, 0.40 inch ID stainless steel test pipe. Differential pressure is measured by means of pressure transducers across a 10 foot section of the test pipe called the "Test Section." The Test Section begins at a point 10 feet along the test pipe. After the fluid flows through the Test Section, it is looped back into the pump. The output of the differential pressure measurements is registered by a computer running LabVIEW automation software available from the National Instruments Corporation. It will be understood that other methods of testing drag reduction may be used.

In a typical experiment a 15 gallon reservoir is filled with 8 gallons of base fluid comprising either tap water or brine, which will provide a baseline and to verify proper operation of the flow loop. The base fluid can also be produced water from a well or other process water. One suitable brine consists of 7% by weight potassium chloride solution. The base fluid is recirculated for 2 minutes at a flow rate of 10 gpm, the baseline point is recorded, and the flow loop is then stopped. The drag-reducing additive or prior art drag reducer is then injected using a 60 ml syringe at doses between 0.05 to 2 gpt. The fluid is then recirculated in the loop. The flow rate initially is set at 12 gpm and then ramped down to 2 gpm in 2 gpm increments. At each flow rate the fluid is recirculated for 60 seconds. After 2 gpm flow rate has been reached, the flow rate is ramped back to 12 gpm in 2 gpm increments. This part of test is referred to as "ramping." After the last 12 gpm setting is reached, the flow rate is reduced to 10 gpm and the liquid is allowed to further recirculate in the loop for 10 minutes. This part of experiment is referred to as "recirculation." During recirculation differential pressure is measured at the beginning (t=0) and at the end (t=10 min) of the process. Performing the drag reduction experiment in such way allows one to simulate situations of changing flow rate gradients typically encountered in the oilfield, such as in performing hydraulic fracturing jobs. The percent friction reduction (% FR) is calculated at each flow rate as follows:

$$\% \ FR = \frac{DP_{BL} - DP_S}{DP_{BL}} \times 100\%$$

where $DP_{BL}$ and $DP_S$ are the differential pressures obtained without and with drag reducing system, respectively. The value of $DP_{BL}$ represents 100% friction baseline for water or brine.

At each flow rate, the value of $DP_{BL}$ is calculated using the following set of equations:

$$\Delta P_{BL} = \frac{L \times v \times \rho \times f}{25.8 \times D}$$

$$v = \frac{Q}{2.45 \times D^2}$$

$$f = \frac{0.3164}{4} \times Re^{0.25}$$

$$Re = \frac{928 \times D \times v \times \rho}{\mu}$$

where L is the length of the test section measured in inches, v is fluid velocity in ft/sec, $\rho$ is the fluid density in lb/gal, D is the internal diameter of the pipe measured in inches, Q is volumetric flow in gals/min, f is the Fanning friction factor, Re is Reynolds number, and $\mu$ is dynamic viscosity of the liquid in cP. The units for differential pressures are psi.

Core Permeability Testing

The impact of samples on core permeability was evaluated with a Formation Response Tester (FRT) using the following method. First, a 2 inch long, 1 inch diameter section is cut out of an Ohio sandstone core with a permeability around 1 milliDarcy (mD) using a lapidary trim saw. The cut core is then washed with water and dried overnight at 230° F. The wash water is preferably around 2.0% KCl so as to not damage clays that may be present in the core. Diameter and length of the core are measured with a caliper. The core is then deaerated under vacuum at 28-30 inches of mercury (in Hg) for 2 hours and saturated with 7% KCl brine overnight. The saturated core is then placed in the core holder chamber of the FRT instrument, at room temperature. The core chamber is subjected to 1500 psi confining pressure and 500 psi back pressure. Permeability of the core is measured in production this permeability is taken as the initial permeability value, $K_i$. After production flow has been stopped, 1 gallon of 0.166 volume % solution of the drag-reducing additive in 7% KCl brine is flowed across the end of the core at a flow rate of 0.8 L/min for 30 minutes under the applied 100 psi pressure gradient. After the solution containing the drag-reducing additive has been pumped for 30 minutes, the core is again flooded in production direction using the same conditions as used in determining initial permeability. Final permeability of the core, $K_f$, is determined. The percentage of permeability regained due to the use of the samples is then calculated as $$\frac{K_f}{K_i} \times 100\%.$$

Rheology Measurements

Rheological measurements were performed to characterize materials of the present invention using the AR-G2 rheometer with 40 mm 2° cone-and-plate geometry from TA instruments. In a typical experiment a sinusoidal oscillating strain was applied to a sample at a frequency of 1 Hz (ω=6.283 radians per s), and stress varied between 0.05 and 150 Pa. Details of rheological measurements and meaning of principal rheological parameters are known to those skilled in the art. Materials of the present invention, as well as the emulsion polymers of the prior art, can be characterized by a combination of elastic (G') and viscous (G") modulus. The magnitude of complex viscosity, η*, can be calculated as $$|\eta^*| = \left[\left(\frac{G''}{\omega}\right)^2 + \left(\frac{G'}{\omega}\right)^2\right]^{1/2}$$

Example 1

In a beaker, 22.5 grams of an ethoxylated castor oil surfactant such as Stepantex CO-30, available from Stepan Corporation, are mixed with 17.5 grams of d-limonene. The mixture is stirred until clear amber-colored solution is obtained. To this mixture is added 60 grams of the polymer described in Samples 1-1 through 1-3 below. The resulting mixture is then stirred at 300 rpm until a homogeneous, flowable formulation is obtained. Friction reducing performance and effect on core permeability are then evaluated as described above. Within the teachings of this example, the following samples were prepared:

Sample 1-1: Drag-reducing additive in which the polymer is the anionic copolymer emulsion of acrylamide sodium acrylate, such as Hychem AE853, available from Hychem, Inc. This sample had an elastic modulus G'=9.6 Pa, viscous modulus G"=8.8 Pa, complex viscosity of 2.1 Pa s, and did flow easily. Both of these values were much lower than the corresponding values established for AE853 polymer, which had G'=237.4 Pa, G"=70 Pa, and |η*|=39.4 Pa s.

Sample 1-2: Drag-reducing additive in which the polymer is a nonionic polyacrylamide emulsion. In a preferred embodiment, the polymer is Hychem NE823, available from Hychem, Inc.

Sample 1-3: Drag-reducing additive in which the polymer is a cationic copolymer emulsion of acrylamide and dimethylaminoethylacrylate methyl chloride quarternary salt (DMAEA MCQ), such as Hychem CE335, available from Hychem, Inc.

Table 1 summarizes the drag reduction performance of Samples 1-1 through 1-3, as well as the performance of constituent conventional polymer emulsions used alone. The dosing of both the Samples and the conventional polymer emulsions is 1 gpt of the conventional polymer emulsion.

TABLE 1

| Sample | Flow rate (gpm) | % Friction Reduction in Water | % Friction Reduction in 7% KCl Brine |
|---|---|---|---|
| Sample 1-1 | Ramping | | |
| | 12 | 77 | 77 |
| | 6 | 71 | 72 |
| | 12 | 77 | 77 |
| | Recirculation | | |
| | 10 (t = 0 min) | 76 | 74 |
| | 10 (t = 10 min) | 76 | 76 |
| Sample 1-2 | Ramping | | |
| | 12 | 78 | 77 |
| | 6 | 55 | 68 |
| | 12 | 61 | 67 |
| | Recirculation | | |
| | 10 (t = 0 min) | 55 | 61 |
| | 10 (t = 10 min) | 48 | 54 |
| Sample 1-3 | Ramping | | |
| | 12 | 77 | 79 |
| | 6 | 72 | 74 |
| | 12 | 78 | 77 |
| | Recirculation | | |
| | 10 (t = 1 min) | 77 | 75 |
| | 10 (t = 10 min) | 77 | 69 |
| AE853 | Ramping | | |
| | 12 | 75 | 70 |
| | 6 | 69 | 60 |
| | 12 | 75 | 66 |
| | Recirculation | | |
| | 10 (t = 0 min) | 76 | 64 |
| | 10 (t = 10 min) | 76 | 62 |
| NE823 | Ramping | | |
| | 12 | 78 | 77 |
| | 6 | 63 | 52 |
| | 12 | 64 | 62 |
| | Recirculation | | |
| | 10 (t = 0 min) | 58 | 57 |
| | 10 (t = 10 min) | 50 | 51 |
| CE335 | Ramping | | |
| | 12 | 78 | 62 |
| | 6 | 73 | 64 |
| | 12 | 79 | 75 |
| | Recirculation | | |
| | 10 (t = 0 min) | 77 | 72 |
| | 10 (t = 10 min) | 77 | 60 |

Table 1 illustrates that although all Samples are effective drag reducers, some are more preferable than others. As such, microemulsified polymer systems made with anionic polymers are preferred over those made with a nonionic or cationic polymers. Table 1 also illustrates the benefit of using the Samples over conventional polymers. Table 1 indicates a rapid decrease in the percent friction reduction achieved with conventional drag reducing polymer emulsions upon transition from water to 7% KCl brine, while this is not the case with the Samples. Also, under equivalent conditions, the Samples yielded consistently higher values of friction reduction than the corresponding polymer emulsions alone. The data in Table 1 also indicates that in brine, cationic drag reducing polymer Hychem CE335 had to be recirculated in the loop for a substantial period of time until the optimum drag reduction of 75% was achieved, while the system of the present invention based on the same polymer achieved this high level of drag reduction immediately.

Example 2

In a beaker, 20 grams of ethoxylated castor oil are mixed with 20 grams of terpene. The mixture is stirred until clear amber-colored solution is obtained. To this mixture is added 60 grams of the copolymer described in Sample 2-1, 2-2, or 2-3 below. The resulting mixture is then stirred at 300 rpm until a homogeneous, flowable formulation is obtained. Friction reducing performance and effect on core permeability are then evaluated as described above. Within the teachings of this example, the following samples were prepared:

Sample 2-1: A copolymer emulsion of acrylamide and sodium acrylate is combined with ethoxylated castor oil surfactant and peppermint oil terpenes according to the procedure in Example 2 above. In a preferred embodiment, the copolymer emulsion is Hychem AE853, available from Hychem, Inc., and the ethoxylated castor oil surfactant is Stepantex CO-30, available from Stepan Corporation. The peppermint oil terpene is available from GreenTerpene.com.

Sample 2-2: A copolymer emulsion of acrylamide and sodium acrylate is combined with ethoxylated castor oil surfactant and *eucalyptus* oil terpenes according to the procedure in Example 2 above. In a preferred embodiment, the copolymer emulsion is Hychem AE853, available from Hychem, Inc., and the ethoxylated castor oil surfactant is Stepantex CO-30, available from Stepan Corporation. The *eucalyptus* oil terpene is available from GreenTerpene.com.

Sample 2-3: A copolymer emulsion of and sodium acrylate is combined with a sorbitan monooleate surfactant and a terpene comprising d-limonene according to the procedure in Example 2 above. In a preferred embodiment, the copolymer emulsion is Hychem AE853, available from Hychem, Inc., and the surfactant is TWEEN 80. The d-limonene is available from Florida Chemical Company.

Drag reduction performance of Samples 2-1 through 2-3 in 7% KCl brine is summarized in Table 2. The dosing of both the Samples and the conventional polymer emulsions is 1 gpt of the conventional polymer emulsion.

TABLE 2

| Sample | Flow rate | % Friction Reduction in 7% KCl Brine |
|---|---|---|
| Sample 2-1 | Ramping | |
| | 12 | 77 |
| | 6 | 73 |
| | 12 | 77 |
| | Recirculation | |
| | 10 (t = 0 min) | 75 |
| | 10(t = 10 min) | 74 |
| Sample 2-2 | Ramping | |
| | 12 | 77 |
| | 6 | 73 |
| | 12 | 77 |
| | Recirculation | |
| | 10 (t = 0 min) | 76 |
| | 10 (t = 10 min) | 74 |
| Sample 2-3 | Ramping | |
| | 12 | 77 |
| | 6 | 72 |
| | 12 | 77 |
| | Recirculation | |
| | 10 (t = 0 min) | 75 |
| | 10 (t = 10 min) | 74 |

Table 2 shows that Samples 2-1 through 2-3 caused a reduction in friction by more than 70% and were superior to drag reducing polymer AE853 used alone (Table 1).

The results of core permeability evaluation with systems of the invention indicated that samples from both Table 1 and Table 2 yielded regained permeability of greater than 74%. Sample 1-1, which is a particularly preferred embodiment, yielded regained permeability of 97%.

Example 3

To 27.3 g of ethoxylated castor oil surfactant (Stepantex CO-30), 72.7 g of Hychem AE853 copolymer emulsion was added, and the mixture was stirred to form Sample 3. Formulation of a paste-like, highly viscous material was observed. The paste was loaded into a syringe and extruded into the base liquid to achieve a dose of 1 gpt based on polymer actives. This sample had an elastic modulus G'=234 Pa, viscous modulus G"=87 Pa, and complex viscosity |η*|=42 Pa s. This material was much less flowable than both material of example 1-1 and prior art friction reducer Hychem AE853, as indicated by significantly higher values of G' and |η*|.

TABLE 3

| Sample | Flow rate | % Friction Reduction in 7% KCl Brine |
|---|---|---|
| Sample 3 | Ramping | |
| | 12 | 76 |
| | 6 | 71 |
| | 12 | 76 |
| | Recirculation | |
| | 10 (t = 0 min) | 75 |
| | 10(t = 10 min) | 75 |

The compositions of the present invention can be used for aiding in the recovery of crude oil and natural gas from subterranean formations. It is possible to use these compositions by a variety of means. For example, in one suitable embodiment, compositions of the present invention may be delivered to the use site as a single formulation. To make such formulation, it is possible to mix the components in any order. In the other suitable unlimited embodiment, the individual components making compositions of this invention can be mixed "on the fly". Other means of using the systems of this invention may include, but are not limited to pre-dissolving one or more components in the treatment fluid or pre-blending two or more components prior to the addition of a third one. In preferred embodiments, acceptable treatment ranges may include adding from about 0.01 gallons to 50 gallons of drag-reducing additive per 1,000 gallons of the aqueous treatment fluid.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and claimed herein.

It is claimed:

1. A method comprising the steps of:
   preparing a drag-reducing additive by mixing a dispersion polymer with a surfactant and a solvent;
   forming a drag-reducing composition by combining the drag-reducing additive with an aqueous treatment fluid; and
   injecting the drag-reducing composition into a subterranean formation, a pipeline or a gathering line.

2. The method of claim 1, wherein the step of forming the drag-reducing composition with the aqueous treatment fluid further comprises the step of adding the drag-reducing additive into the aqueous treatment fluid on-the-fly as the aqueous treatment fluid is pumped into the subterranean formation, the pipeline or the gathering line.

3. The method of claim 1, wherein the step of forming the drag-reducing composition further comprises the step of adding the drag-reducing additive to the aqueous treatment fluid before the drag-reducing composition is pumped into the subterranean formation, the pipeline or the gathering line.

4. The method of claim 1, wherein the step of forming the drag-reducing composition further comprises adding from about 0.01 gallons to about 50 gallons of drag-reducing additive per 1,000 gallons of the aqueous treatment fluid.

5. The method of claim 1, wherein the step of preparing the drag-reducing additive further comprises mixing 40-85% by weight of the dispersion polymer with 10-35% by weight of the surfactant with an HLB greater than about 8 and 5-30% by weight of the solvent.

6. The method of claim 1, wherein the aqueous treatment fluid comprises an acid.

7. A method comprising the steps of:
preparing a drag-reducing additive by mixing 40-85% by weight of a dispersion polymer with 10-35% by weight of a surfactant with an HLB greater than about 8 and 5-30% by weight of a solvent;
forming a drag-reducing composition by combining the drag-reducing additive with an aqueous treatment fluid; and
injecting the drag-reducing composition into a subterranean formation, a pipeline or a gathering line.

8. The method of claim 7, wherein the step of forming the drag-reducing composition with the aqueous treatment fluid further comprises the step of adding the drag-reducing additive into the aqueous treatment fluid on-the-fly as the aqueous treatment fluid is pumped into the subterranean formation, the pipeline or the gathering line.

9. The method of claim 7, wherein the step of forming the drag-reducing composition further comprises the step of adding the drag-reducing additive to the aqueous treatment fluid before the drag-reducing composition is pumped into the subterranean formation, the pipeline or the gathering line.

10. The method of claim 7, wherein the step of forming the drag-reducing composition further comprises adding from about 0.01 gallons to about 50 gallons of drag-reducing additive per 1,000 gallons of the aqueous treatment fluid.

11. The method of claim 7, wherein the aqueous treatment fluid comprises an acid.

* * * * *